J. M. LANSDEN.
BRAKE.
APPLICATION FILED DEC. 2, 1918.
1,397,590.
Patented Nov. 22, 1921.
2 SHEETS—SHEET 1.
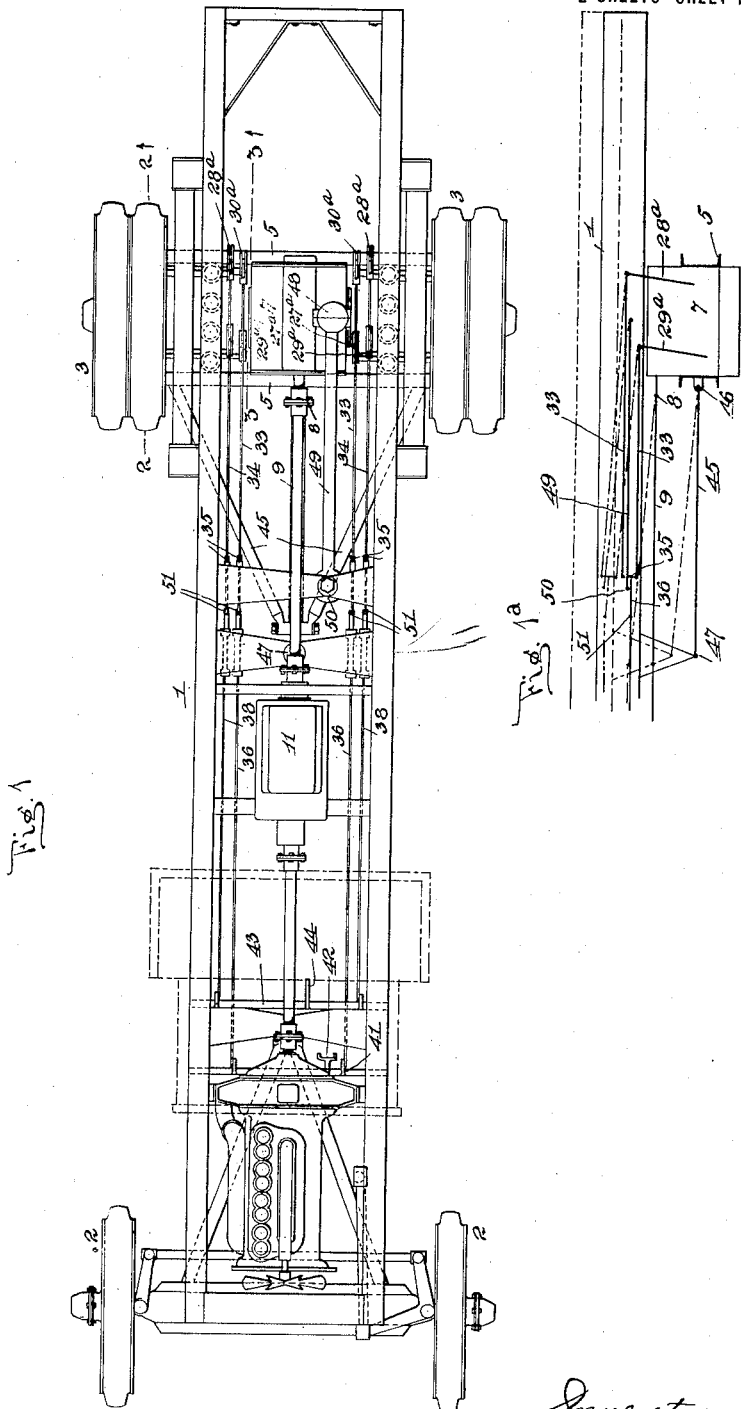

J. M. LANSDEN.
BRAKE.
APPLICATION FILED DEC. 2, 1918.
1,397,590.
Patented Nov. 22, 1921.
2 SHEETS—SHEET 2.
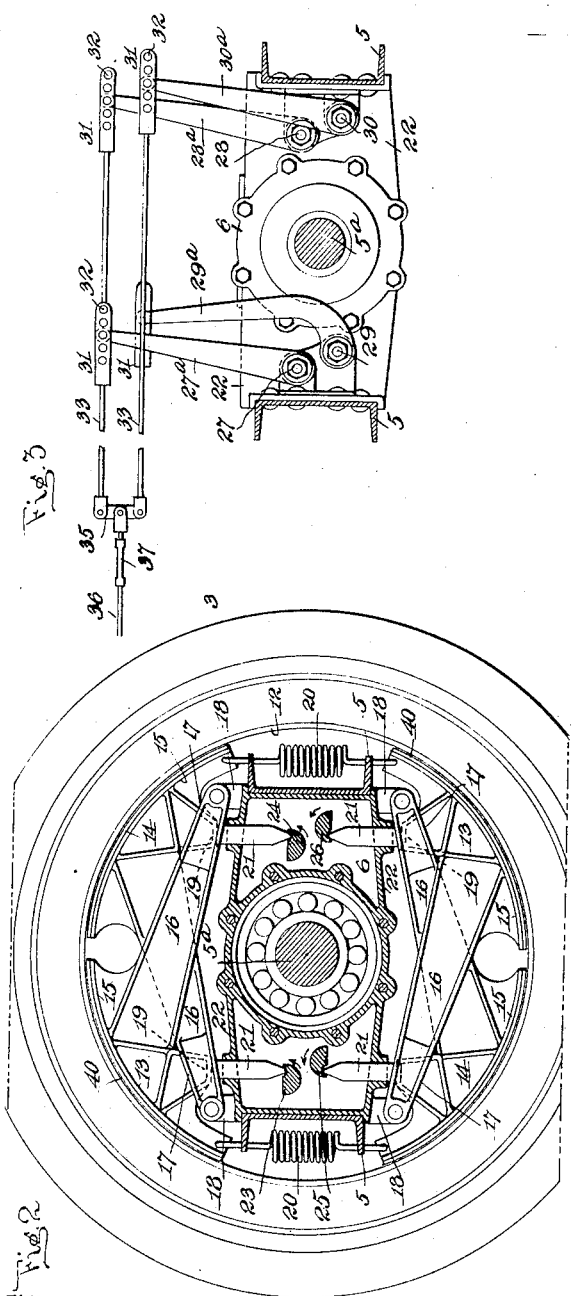
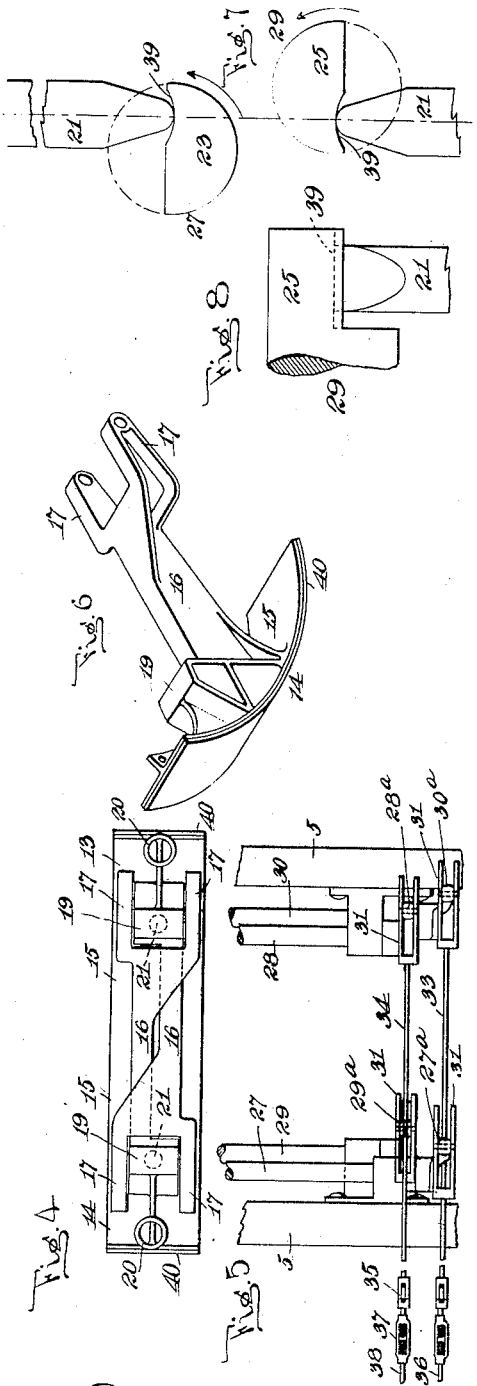
Witnesses:
Inventor
John M. Lansden
By Dyer & Taylor
Attorneys

UNITED STATES PATENT OFFICE.

JOHN M. LANSDEN, OF NEW YORK, N. Y.

BRAKE.

1,397,590. Specification of Letters Patent. Patented Nov. 22, 1921.

Application filed December 2, 1918. Serial No. 264,891.

*To all whom it may concern:*

Be it known that I, JOHN M. LANSDEN, a citizen of the United States, and a resident of the borough of Manhattan, city, county, and State of New York, have invented a certain new and useful Brake, of which the following is a specification.

My invention relates to braking devices and more particularly to such devices in connection with motor trucks but it will be understood that the invention may be carried out in connection with light or pleasure automobiles or with vehicles of other types.

The objects of the invention are to provide a brake which will at the same time be sensitive and positive in character; be readily adjusted to take up wear; which will be carried within the boundaries of the wheel to which the braking effort is applied; by means of which the braking effort will be equally distributed to the wheel; which may be easily adjusted relatively to the brake applying mechanism; which will be accessible for repair or replacement; which will be economical of manufacture and capable of extended use without requiring replacement or repairs.

These and further objects will more fully appear in the following specification and accompanying drawings, considered together or separately.

I have illustrated one embodiment of my invention in the accompanying drawings in which corresponding parts in all of the several figures are designated by similar reference characters, and in which—

Figure 1 is a top plan view of the chassis of a motor vehicle provided with my invention.

Fig. 1ᵃ is a diagrammatic side elevation showing the positions assumed by the brake rods at normal, and at over load.

Fig. 2 is a sectional view of the power axle showing a wheel and set of brake shoes in elevation.

Fig. 3 is a sectional view of axle taken on the line 3—3 of Fig. 1.

Fig. 4 is a top plan view of a pair of brake shoes.

Fig. 5 is a top plan view of a portion of the axle and the brake applying mechanism carried thereby.

Fig. 6 is a perspective view of a brake shoe.

Fig. 7 is a detail elevation illustrating a pair of brake applying cams and pins, and Fig. 8 is a detail side elevation of a cam and its coöperating pin.

In carrying out my invention I employ a vehicle comprising a chassis frame 1 consisting of the usual longitudinal and transverse frame members and which is supported on front or steering wheels 2 and rear or driving wheels 3. The wheels 3 are preferably carried at the outer extremities of an axle comprising parallel longitudinal members 5 and transverse end members and caps 6 thereby producing a box-like structure open at top or bottom for the greater part of its length. The axle carries a differential in a casing 7 positioned between the members 5 and at the center of the axle and the differential mechanism is connected by means of a flexible coupling 8 to one section of a jointed propeller shaft 9 which extends from the engine 10 to the differential and through the usual speed changing transmission 11. The sections of the shaft 9 are secured together by means of flexible joints similar to the coupling 8.

The driving wheels 3 are preferably of the double tire type and with a single range of spokes beneath the outermost tire. To the inner side of that portion of the felly which carries the innermost tire is secured an annulus 12 which forms the drum of the brake which is of the internal type, that is the brake shoes coact with the interior of the drum.

The brake shoes 13 and 14 are arranged in pairs grouped around the axle and supported thereby. The brake shoes are duplicates and interchangeable. Each shoe comprises a segment 15 having a radius slightly less than the inside radius of the drum 12 and is carried at one end of a lever 16 the opposite end of which is formed with jaws 17, 17 which are pivoted to a bearing 18 carried by the cap 6. The lever 16 is set to one side of the center line between the jaws 17.

Each lever is provided with a projection 19 which is located in line with the center of the jaws and extends in a general direction away from the interior surface of the shoe segment carried by the lever. The lever, jaws, projection and shoe segment are suitably flanged to give the maximum strength for the minimum amount of metal employed. Each shoe of each pair is attached to a similar shoe on the opposite side of the axle by means of a spring 20.

When the shoes 13 and 14 of a pair are arranged in position on the axle the levers 16 extend in opposite directions and are secured to bearings 18 on opposite sides of the longitudinal center of the axle. The projection 19 of one lever 16 engages between the jaws 17 of the other lever of that pair and the relative dimensions of the projection and the space between the jaws is such as to permit movement of the projection toward and away from the axle but movement of the projection in the direction of the axis of the wheel is prevented.

Each projection 19 is engaged by a pin 21 which projects through a wall 22 of the cap 6 to which the jaws 17 are pivoted, and the pin engaging the projection of one lever is located in proximity to the pivot of the second lever of the pair.

Each pin at the end opposite that end engaged by the projection is engaged by a cam 23 or 24 and the cams 25 and 26 of oppositely disposed pairs of brake shoes are oppositely faced in order that the segments of each pair may be moved by the cams in opposite directions. The cams 23 and 24 are carried at the ends of shafts 27 and 28 respectively and the cams 25 and 26 are similarly carried on shafts 29 and 30. The shafts are journaled in the cap 16 and in bearings secured to the longitudinal members 5 of the axle. The shafts 27 and 28 are located above the horizontal center of the axle while the shafts 29 and 30 are below such horizontal center. The cams 23, 24, 25 and 26 and the pins 21 are arranged in the same vertical plane. The shafts 27 and 30 are longer than the shafts 28 and 29.

The shafts 27, 28, 29 and 30 carry levers 27ª, 28ª, 29ª and 30ª respectively at their inner ends. These levers extend in the same direction and the levers 27ª and 30ª are in the same vertical plane while their free ends are on different horizontal levels. The levers 28ª and 29ª are similarly arranged relatively to each other.

The free extremity of each lever has pinned thereto a stirrup 31. The sides of the stirrups are each provided with a series of oppositely disposed openings 32 by means of which the stirrup may be adjusted relatively to the lever. The stirrups of the levers 27ª and 30ª are each secured to a rod 33 and the stirrups of levers 28ª and 29ª carry similar rods 34. All of these rods project toward the front of the vehicle.

The rods 33 are pivoted to opposite ends of an equalizing bar 35 to the center of which a brake rod 36, having a turnbuckle 37, is pivoted. The rods 34 are similarly connected to a similar brake rod 38.

The cams 23, 24, 25, and 26 are preferably constructed as follows: The shafts 27 and 29 at the forward side of the axle, are spaced one to each side of the axial line of the pins 21 at that side, which pins are in axial alinement. The outer end of each shaft is flattened to form the cams 23 and 25. A wide, shallow spherical groove 39 is cut in the flat face of each shaft and the center of each groove is in vertical alinement with the pins 21. The flat faces and grooves are oppositely disposed and the groove in cam 23 engages the bottom of the upper pin 21 and the groove in the cam 25 engages the top of the lower pin 21. The engaging ends of the pins are tapered to form wedges and the extremities of the pins which engage the grooves are rounded to prevent wear and to permit freedom of movement of the engaging parts. The arrangement of the cams 24 and 26 and the pins 21 at the opposite side of the center line of the axle is the same as that above described. The arrangement of brake drum, shoes, levers, cams, and brake rods are duplicated at the opposite end of the axle and in coöperation with the wheel carried thereby.

The brake shoe segments are each provided with a lining 40 of fiber or other suitable material which may be readily replaced when worn.

The brake rods 36 at each side of the chassis frame extend forward and each is connected to a crank arm on a shaft 41 extending transversely of the frame and in proximity to the driver's seat. A pedal 42 attached to the shaft enables the operator by pressure of his foot to apply one shoe of each pair to the drums of both driving wheels.

The brake rods 38 extend forward and are attached to crank arms on a shaft 43 parallel to the shaft 41. A lever 44 on the shaft 43 and in convenient reach of the operator enables him to apply the second of each pair of brake shoes to both of the driving wheels.

The brake shoes 13 of each pair engage the drum at diametrically opposite points, and the shoes 14 of each pair contact with diametrically opposite points in the drum. When the pedal 42 for example is depressed brake shoes will be caused to engage at opposite sides of each wheel and the braking effort will be equally distributed to both wheels. By the use of the equalizing bars 35 the two shoes connected thereto and to the brake rod 36 or 38 will be applied with equal pressure, the wear on the shoes will be equally distributed and the lining of one shoe will not be worn at a more rapid rate than will that of another. This will add to the effectiveness of the brake for the reason that the maximum braking surface will at all times be available.

As the brake shoe lining becomes worn but not to such an extent as to require relining the connections between the stirrups 31 and their respective levers may be broken, the levers moved forward the required distance by hand and the ends of the levers secured in a forward pair of perforations 32. For a more delicate adjustment the turnbuckles 37 may be operated to lengthen or shorten the brake rods 36, 38. In making adjustments as above described the cams will be rotated to assume new positions relatively to the brake shoes and the brakes may be applied as before without changing the throw of the pedal 42 or lever 44.

The pin 21 engages the brake shoe in line with the centers of said shoe and at a point removed from the pivot of the brake lever whereby less effort on the part of the operator will be required to set the brake. The springs 20, for releasing the brake, are attached to the levers at the greatest distance possible from the pivot points. The springs may, because of the long leverage, be of relatively light tension and the effort of the operator to overcome the tension and apply the brake will be slight.

The tractive effort of the wheels and road and other shocks are transmitted from the wheels through the axle by means of a member 45 pivoted to the axle and, by means of a universal joint 47, to the frame 1 in the longitudinal center line thereof. The member 45 will permit of movement of the axle toward and away from the frame and each brake rod 33 and 34 is provided with a joint 51 in approximately the same vertical plane as the joint 47, whereby the member 45 and rods 33 and 34 will be parallel, irrespective of the position of the axle relatively to the frame.

In operation, when pressure is applied to the pedal 42, the brake rods 36 are pulled to the left, (Figs. 1, 2, 3 and 4). This movement will cause the free ends of the levers 27ª and 30ª to move in the same direction and rotate the cams 23 and 26 in the directions indicated by the arrows in Fig. 2. The rotation of the cams will, through their co-acting pins 21, move the diametrically opposed brake shoes 13, 13 against the tension of the springs 20 and into engagement with the interior of the brake drum 12, and arrest the rotation. When the pedal is released the springs will release the brake shoes from engagement with the drum and restore them, together with the levers, rods and pedal, to their initial position.

When the lever 44 is moved forward the shoes 14, 14 of each set are applied in the manner above described, and when both sets are operated the braking effort is applied to practically the entire periphery of the drum 12, which, because of the fact that it is wholly within the boundaries of the wheel and not subject to injury from road obstructions, may be of a diameter but slightly less than that of the wheel whereby greatly increased areas of friction surfaces, both of the drum and shoes, may be obtained.

While I have illustrated two pairs of levers 16 carried by the axle, it will be understood that as many pairs as there are sides to the axle may be employed. With an axle of rectangular cross section four sets may be used. With a hexagonal axle structure six may be employed, and so on. The only difference being the addition of a number of rods corresponding to 33 and 34, levers such as 27ª, etc., pins 21, and cams 23, etc.

The axle elements 5 carry the usual live members 5ª, and are connected to the chassis frame through the medium of a triangular driving member 45 which is pivoted to the axle at 46. The opposite end of the member is secured to the frame by means of a universal joint at 47. The gear casing 7 carries one member of a universal joint 48, the other member of which forms part of a torque rod 49. The forward end of the torque rod is secured to the frame 1 by means of a universal joint 50.

The shaft section 9, the member 45, and the torque rod 49 are of the same length, and arranged in parallel relation. When the springs are flexed the torque rod 49 will prevent the axle turning in the direction of the longitudinal center of the frame, and the parallelism of the shaft section 9, member 45, and the torque rod 49, will be preserved. The pivotal connection 51 of the brake rigging rods 34 and 35, with the pull rods 36 and 38, will retain the rods 34 and 35 parallel with the elements 9, 45 and 49, and the tension of the brake mechanism will remain constant irrespective of the position of the chassis frame relatively to the axle.

In Fig. 1ª I have illustrated diagrammatically the position of the parts in two positions. The dotted line illustrates the position of no load, and the full lines show the parts in position of normal load.

The movements of the brake lever 44 and brake pedal in applying or releasing the brakes are constant, notwithstanding the position of the frame relatively to the axle, and the brakes having been set with the vehicle loaded to capacity will remain set when all of the load has been removed. With the ordinary brake rigging a loaded truck, if stopped on a hill and the load removed, the axle will rotate when the frame raises as the load is removed. This turning of the axle will cause relative movement of the parts of the brake rigging carried on the frame, and those parts carried by the axle and wheel and the brake will be released. This will often result in the vehicle moving down hill with disastrous results. With the brake mechanism of the present application this danger is removed.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:—

1. A brake, comprising a drum, a plurality of pairs of brake shoes pivoted within the drum, the shoes of each pair being arranged on diametrically opposite sides of the drum, and means outside of the drum for independently engaging a shoe of each pair to the drum.

2. A brake comprising a drum, a plurality of pairs of brake shoes pivoted within the drum, the shoes of each pair being arranged on opposite sides of a diameter of the drum, and means outside of the drum for independently and simultaneously engaging a shoe of each pair with the drum.

3. A brake comprising a drum, a plurality of pairs of brake shoes having pivotal movement within the drum, the pivot of one shoe of a pair being diametrically opposite the pivot of the other shoe of the pair and means outside of the drum for simultaneously engaging the diametrically opposed shoes of a pair with the drum.

4. A brake, comprising a drum, a plurality of levers, having pivotal movement within the drum, said levers being in pairs, one lever of each pair being on one side of a diameter of the drum and the other of said pair on the opposite side thereof, the fulcrums of the levers of each pair being diametrically opposed, a brake shoe carried by each lever and adapted to engage the drum, and means, for simultaneously and independently engaging a shoe of each pair with the drum.

5. A brake, comprising a drum, a plurality of levers, having pivotal movement within the drum, said levers being in pairs, one lever of each pair being on one side of a diameter of the drum and the other of said pair on the opposite side thereof, the fulcrums of the levers of each pair being diametrically opposed, a brake shoe carried by each lever and adapted to engage the drum, and means engaging the levers between the fulcrums and the shoes for simultaneously and independently engaging a shoe of each pair with the drum.

6. A brake comprising a drum, a wheel carrying the drum, an axle supported by the wheel, a lever pivoted on each side of an axial plane of the axle, the fulcrums of the levers being on opposite sides of an axial plane perpendicular to the first mentioned plane, a brake shoe carried by each lever, and means independent of the levers for engaging the levers and applying the shoes to the drum.

7. A brake comprising a drum, a wheel carrying the drum, an axle supported by the wheel, a lever pivoted on each side of an axial plane of the axle, the fulcrums of the levers being on opposite sides of an axial plane perpendicular to the first mentioned plane, a brake shoe carried by each lever, said shoes being diametrically opposed within the drum and means within the drum for engaging the levers and independently and simultaneously appling the shoes to the drum.

8. A brake comprising a drum, a wheel carrying the drum, an axle supported by the wheel, a lever pivoted on each side of an axial plane of the axle, said levers lying within the drum, the fulcrums of the levers being on opposite sides of an axial plane perpendicular to the first mentioned plane, a brake shoe carried by each lever, said shoes being diametrically opposed, and separate means within the drum for engaging each lever and applying the shoes to the drum, said means being unsecured to the levers.

9. A brake comprising a drum, a wheel carrying the drum, an axle supported by the wheel, a lever pivoted on each side of the axle, a brake shoe carried by each lever, said shoes being diametrically opposed, and separate means for engaging each lever at a point between its pivot and its shoe to apply the shoes to the drum, said means being unsecured to the levers.

10. A brake comprising a drum, a wheel carrying the drum, an axle supported by the wheel, a pair of levers pivoted to the axle on opposite sides of the longitudinal center thereof and extending in opposite directions, a brake shoe carried by each lever, and means within the axle for independently and simultaneously applying one shoe of each pair to the drum.

11. A brake comprising a drum, a wheel carrying the drum, an axle supported by the wheel, a pair of third class levers pivoted to the axle on opposite sides of the longitudinal center thereof and extending in opposite directions, a brake shoe carried by each lever, said shoes being diametrically opposed, and means within the drum for independently applying the diagonally opposed shoes of each pair to the drum, said applying means being movable in right lines 12. A brake comprising a drum, a wheel carrying the drum, an axle supported by the wheel and extending within the drum, a pair of levers pivoted to the axle, a brake shoe carried by each lever, said levers and shoes being disposed within the drum and lying in the same plane, freely movable means within the axle and coöperating with the levers whereby the shoes may be independently engaged with the drum.

13. A brake comprising a drum, a wheel carrying the drum, an axle supported by the wheel, a pair of levers pivoted to the axle, a brake shoe carried by each lever, said shoes being disposed within the drum and lying in the same plane, cams within the axle and operatable from a distant point, said cams coöperating with the levers whereby the shoes may be independently engaged with the drum.

14. A brake comprising a drum, a wheel carrying the drum, an axle supported by the wheel, a pair of levers pivoted to the axle, said levers extending in opposite directions from their pivots, there being an opening in each lever adjacent the pivot thereof, a projection on each lever, the projection on one lever engaging the opening in the other lever, a brake shoe carried by each lever and adapted to coöperate with the drum, a member carried by the axle in alinement with and engaging each projection, a cam engaging each member, whereby the shoes may be caused to engage the drum.

15. A brake comprising a drum, a wheel carrying the drum, an axle supported by the wheel, a pair of levers pivoted to the axle, said levers extending in opposite directions from their pivots and lying side by side, there being an opening in each lever adjacent the pivot thereof, a projection on each lever, the projection on one lever engaging the opening in the other lever, a brake shoe carried by each lever and adapted to coöperate with the drum, a member carried by the axle in alinement with and engaging each projection, a cam engaging each member, whereby the shoes may be caused to engage the drum.

16. A brake comprising a drum, a wheel carrying the drum, an axle supported by the wheel, a box-like element carried by the axle, a pair of levers pivoted to the element on opposite sides thereof, the levers of each pair lying side by side and extending in opposite directions from their pivots, a pair of jaws at the pivot end of each lever, a projection on each lever, said projection engaging between the jaws of the adjacent lever, a brake shoe carried by each lever, a pin movable in the box-like member engaging each projection, a cam engaging each pin, the cams of opposed pairs of levers facing in opposite directions, and means for rotating the cams in pairs whereby diametrically opposed brake shoes of each pair will be simultaneously brought into engagement with the drum.

17. A brake comprising a drum, a wheel carrying the drum, an axle supported by the wheel, a box-like element carried by the axle, a pair of levers pivoted to the element on opposite sides thereof, the levers of each pair lying side by side and extending in opposite directions from their pivots, a pair of jaws at the pivot end of each lever, opposed levers of each pair being elastically connected together, a projection on each lever, said projection engaging between the jaws of the adjacent lever, a brake shoe carried by each lever, a pin movable in the box-like member engaging each projection, a cam engaging each pin, the cams of opposed pairs of levers facing in opposite directions, and means for rotating the cams in pairs whereby diametrically opposed brake shoes of each pair will be simultaneously brought into engagement with the drum.

This specification signed and witnessed this 21st day of November, 1918.

JOHN M. LANSDEN.

Witnesses:
A. E. RENTON,
ABRAHAM FOSTOVE.